United States Patent [19]

Davis

[11] Patent Number: 4,763,830
[45] Date of Patent: Aug. 16, 1988

[54] METHOD FOR WELDING RIBBED PIPE
[75] Inventor: Paul K. Davis, Alameda, Calif.
[73] Assignee: Pacific Roller Die Co., Inc., Hayward, Calif.
[21] Appl. No.: 944,522
[22] Filed: Dec. 22, 1986
[51] Int. Cl.⁴ ............................................. B23K 31/06
[52] U.S. Cl. ..................................... 228/145; 219/62
[58] Field of Search .................. 228/145, 17.7; 219/62

[56] References Cited
U.S. PATENT DOCUMENTS

| | | | |
|---|---|---|---|
| 1,294,465 | 2/1919 | Horvath | 219/62 X |
| 2,758,366 | 8/1956 | Voetelink | 228/145 X |
| 3,240,177 | 3/1966 | Habdas | 228/145 X |
| 3,255,516 | 6/1966 | Sommer | 219/62 X |
| 3,656,514 | 4/1972 | Kafka | 228/145 X |
| 3,722,075 | 3/1973 | Fay | 228/145 |

Primary Examiner—Nicholas P. Godici
Assistant Examiner—Carmine Cuda
Attorney, Agent, or Firm—Ernest M. Anderson

[57] ABSTRACT

A method is described for manufacturing helically formed pipe from strip material. One side of the strip material is formed to provide a first side flange that projects substantially 90° relative to the plane of the strip. The opposite side of the strip is formed with a channel that includes a second side flange that also projects substantially 90° relative to the plane of the strip but in the opposite direction from the first side flange. The strip material is then helically coiled while the first and second side flanges are moved into abutting contact. Pressure is then applied radially of the pipe axis, forcing the contacting edges of the flanges together while the flanges are welded, thus forming a rib with a helical weld seam located at or near the line of neutral forces in the rib.

12 Claims, 2 Drawing Sheets

METHOD FOR WELDING RIBBED PIPE

BACKGROUND OF THE DISCLOSURE

This invention relates generally to ribbed pipe that is formed by helically coiling strip material and welding the two edges of the strip as they are held in abutting relation. A process for forming such pipe is described in U.S. Pat. No. 3,601,570. The shortcomings of the process described in that patent are several. First, it was difficult to maintain a high speed weld in forming the pipe and/or yet achieve 100% weld penetration; secondly, it was difficult to register the two side edges and maintain those edges in the same plane because of strip camber. For these reasons, many manufacturing problems were presented, resulting in either a weak weld joint or a very slow process of manufacture—and usually both.

Helically welded pipe has also been formed by overlapping the two side edges. But this lap-weld process also results in many failures since many foreign particles, such as scale, are produced in the normal course of manufacture. Moreover, it is well-known that a butt weld connection provides the best form of fusion (or forge) provided that the required heat is applied to the abutting edges and sufficient pressure is applied at the time of fusion.

SUMMARY OF THE INVENTION

This invention provides novel methods for helically forming ribbed pipe from strip having sides that are fused with an abutment weld. These methods may be applied in connection with strip material of varying thickness and at welding speeds ranging upward from 20 lineal feet per minute. The process is of particular value in forming a ribbed pipe in that the edges of the strip material are welded on a helical seam located substantially midway between the inner circumference of the pipe and the outer circumference of the rib. Thus, the weld is made at or substantially near a point where those forces acting on the pipe section (which tend to separate the weld joint) are essentially neutral, being in neither compression not tension.

This invention more particularly involves a method for welding helically formed ribbed pipe from strip comprising the steps of forming one side of the strip to provide a first side flange and the other side of the strip to provide a channel that includes a second side flange. The strip is then coiled while the edges of the two flanges are moved into abutting contact. Pressure is then applied radially of the pipe axis, forcing the abutting edges together, and heat is applied near to the abutting contact causing the first and second flanges to be welded together.

One object of the present invention is to provide an improved method for manufacturing helically formed ribbed pipe.

A second object is to provide a novel form of helically forming and seam welding ribbed pipe, said pipe being formed from strip material and having a rib formed by both edges of the strip material with a butt weld located substantially at the neutral axis of the pipe section.

Further objects of this invention will become apparent in view of the following detailed description.

BRIEF DESCRIPTION OF THE DRAWINGS

In the drawings forming a part of this application and in which like parts are identified by like reference numbers throughout the same.

BRIEF DESCRIPTION OF THE PREFERRED EMBODIMENT

Figure 1:
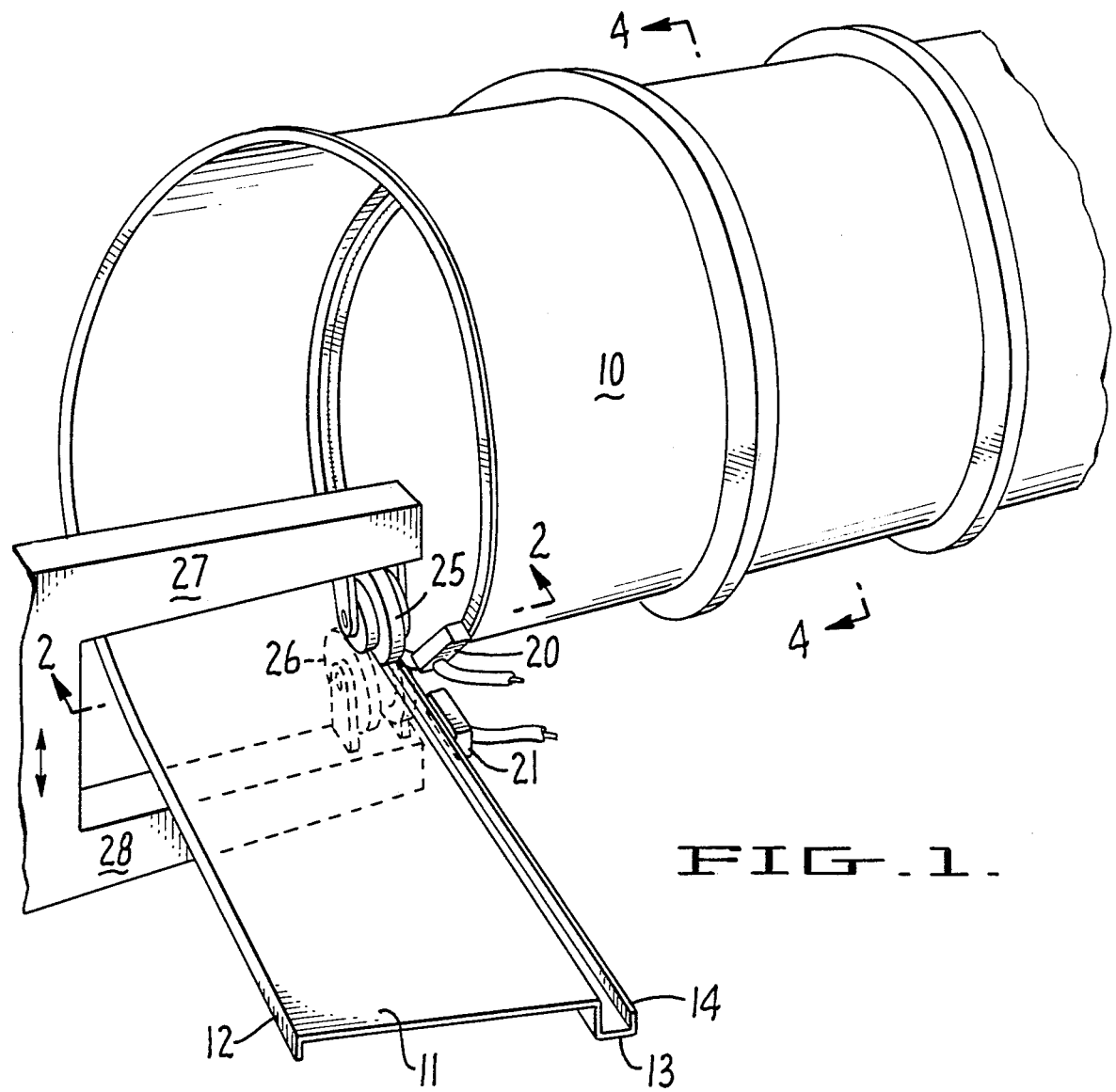
FIG. 1 is a perspective view of a helically ribbed pipe as it is being formed in accordance with the preferred form of this invention.

Referring to FIG. 1, a pipe 10 is shown during its manufacture using the present invention. Pipe 10 is helically formed from strip material 11 which, prior to coiling, is processed through sets of forming rolls (not shown) to provide a first side flange 12 and a channel 13 that includes a second side flange 14.

Flange 12 and channel 13 project from the plane of the strip material to one side thereof, and flanges 12 and 14 project at supplementary angles that allow edge-abutment when the strip is coiled. In the preferred embodiment shown flanges 12 and 14 project from the strip plane at substantially 90°, or right angles. Thus, the rib which is formed on the pipe is essentially of rectangular shape.

Flanges 12 and 14 are preferably formed of substantially equal length so that the weld joint occurs on a spiral substantially midway between the inner circumference of the pipe and the outer circumference of the rib. This construction locates the weld on a helix where the forces that tend to separate the weld joint are essentially neutral (being in neither compression nor tension). For purposes of this application, this condition is referred to as locating the weld on the neutral axis of the pipe section.

Figure 3:
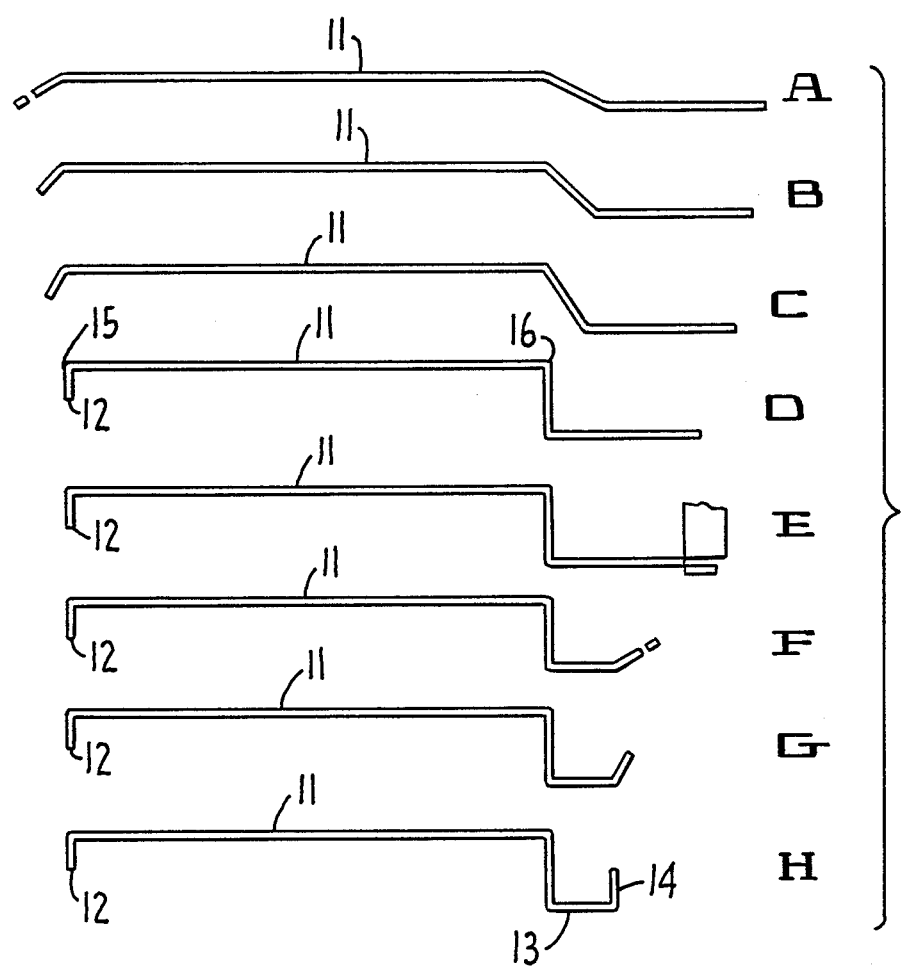
FIG. 3 illustrates transverse sections of strip material as it is progressively formed and deformed in preparation for coiling.

A preferred arrangement of steps for forming flange 12, channel 13, and second flange 14, is shown in FIG. 3. In that regard, the strip material is passed through a set of forming rolls which progressively bend the strip material without creating severe stressing or thinning at the bends. It is well understood in this art that undue thinning or excessive stressing will generally weaken the pipe that is formed.

Strip width, which is one factor that determines the diameter of the pipe, is carefully controlled in the manufacturing process; and, as shown in sections A, B, C and D of FIG. 3, root bend 15, which forms flange 12 and root bend 16 of channel 13 are completely formed before the strip is finally trimmed to a preselected width, as shown in section E. Flange 14 is then formed by further bending steps as shown in sections F, G, and H.

Although uniformity of strip width is important to controlling diameter, the process of forming the pipe lends itself to an additional control over pipe size. This control will be described in connection with the application of pressure during the welding process.

After the strip material has been formed to provide flange 12, channel 13 and flange 14, the deformed strip material is coiled as indicated in FIG. 1. In the process, the side edge of flange 12 is brought into abutting contact with the side edge of flange 14. A pair of electrodes or contacts 20 and 21, which form part of a conventional welding apparatus, engage the sides of flanges 12 and 14. One such apparatus, known as Thermatool, is particularly useful for carrying out the welding process.

It will be noted that the strip edges are spaced apart at the contacts forming an open V whose apex is slightly ahead of the weld point. High frequency current flows from one contact along the edge of the V to the apex and back along the other edge to the other contact. The current density is very high along both edges of the V because of what is known as "skin" effect" and "proximity effect". This high concentration of current preheats the edges so that they are at welding temperature when they come together at the apex. The manufacturer of Thermatool equipment advocates the high speed of travel as being an inherent part of the welding process because it reduces the elapsed time between the contacts and the weld point. The heat developed along the V edges does not have time to be dissipated by conduction to cooler parts before the edges are squeezed together and welded.

Figure 2:
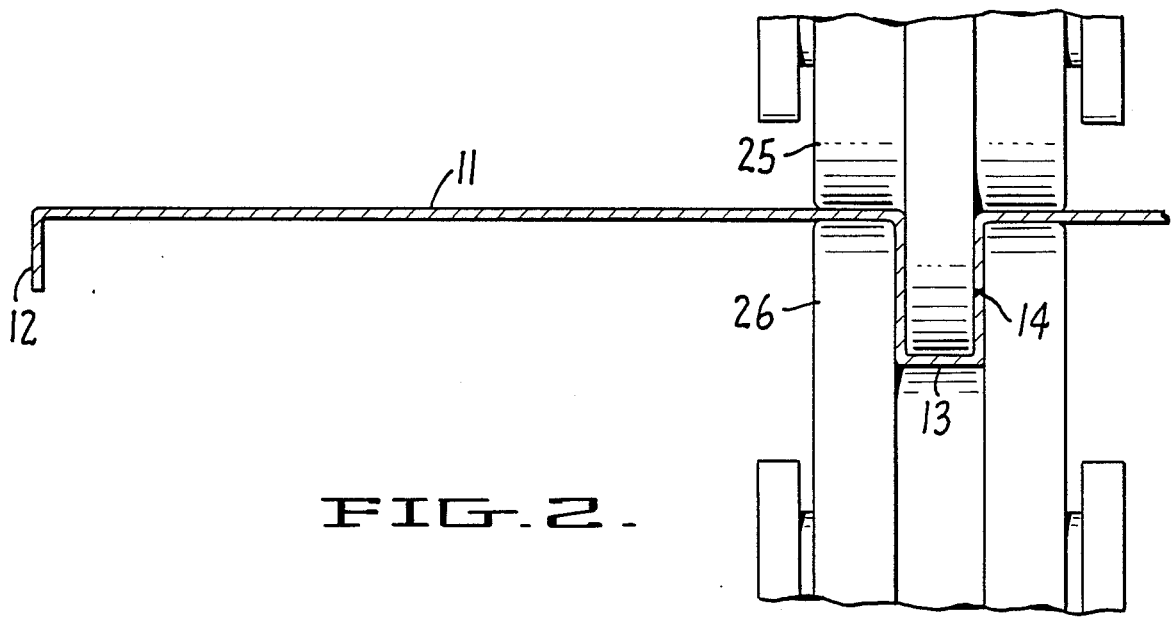
FIG. 2 is a section taken substantialy on the line 2—2 of FIG. 1.
Figure 4:
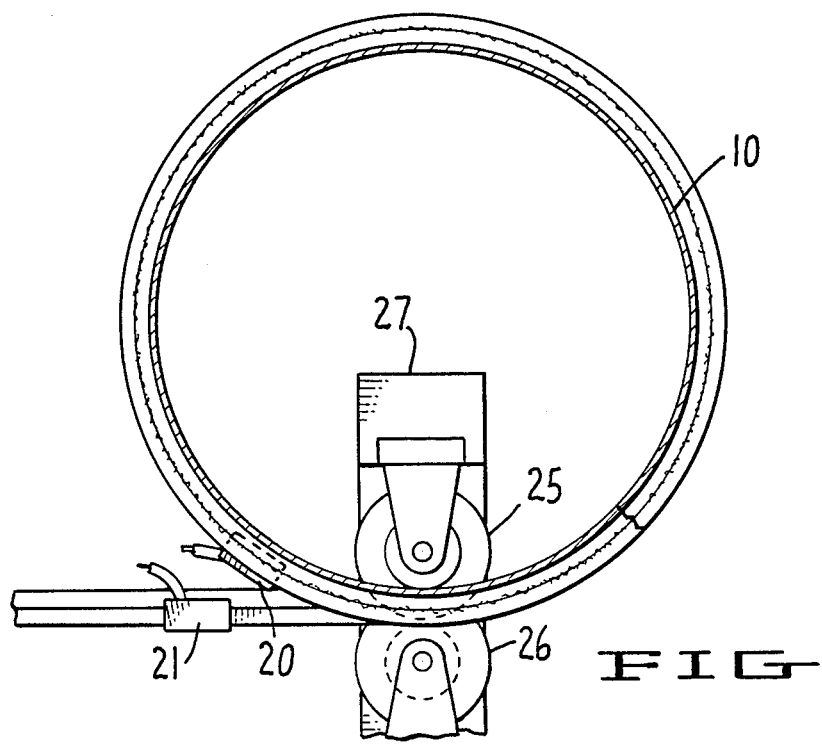
FIG. 4 is a transverse section taken on the line 4—4 of FIG. 1.

Referring to FIGS. 2 and 4 there is shown a pair of rolls 25 and 26, for applying pressure between abutting edges of the first and second flanges directly in front of the contacts. The upper roll 25 is supported from a mandrel 27 that extends within the pipe that is being formed; roll 26 is supported on an arm 28 from beneath the pipe. In the preferred embodiment mandrel 27 and arm 28 are supported from a movable stanchion that may be raised or lowered as suggested by the arrows shown in FIG. 1. This allows the precise position of the rolls to be carefully controlled.

The vertical pressure applied between abutting edges of metal in its plastic state will result in more or less deformation at the weld. This is clearly a factor in maintaining the diameter of the pipe that is formed. As noted above, however, basic diameter changes depend on helix angles and widths of strip. However, "fine tuning" can be accomplished with slight vertical movement in the position of the forming rolls 25 and 26. Vertical movements of rolls 25 and 26 as a unit will displace the weld seam relative to the pipe section's natural neutral axis. Displacing the weld seam inwardly or outwardly from that neutral axis will cause the pipe diameter to increase or decrease. Vertical movements of ±0.125 can be used effectively to control pipe diameter.

Although a preferred embodiment of the invention has been illustrated and described in connection with the formation of helical ribbed pipe, various modifications and changes may be resorted to without departing from the spirit of the invention or the scope of the pending claims, and each such modifications and changes is contemplated. As an example, the strip material may be formed with more than one rib or with ribs of varying sizes or shapes.

What is claimed is:

1. A method for welding helically formed and ribbed pipe from strip having a pair of terminal side edges comprising the steps:

forming one side of strip to provide a first side flange having one of said pair of terminal side edges, forming the opposite side of the strip to provide a channel that includes a second side flange having the other one of said pair of terminal side edges;

coiling said strip material while moving the terminal edge of said first flange into substantially abutting contact with the terminal edge of said second flange;

contacting said first and second side flanges with a pair of welding electrodes in advance of abutting contact between terminal edges;

applying pressure between the terminal and abutting edges of said first and second flanges in a direction substantially radial to the axis of the pipe being formed;

and welding said first and second flanges together along abutting edges.

2. The method of claim 1 wherein the terminal and abutting edges are displaced relative to the neutral axis of the pipe being formed to regulate and adjust pipe diameter.

3. The method of claim 1, said first and second flanges being formed to project from said strip at substantially 90° relative to the plane of the strip prior to coiling.

4. The method of claim 1, said first flange and channel being formed as part of a rib that projects to one side of the strip prior to coiling.

5. The method of claim 1, said first and second flanges being formed to project at complementary angles relative to the strip plane, and positioning said flanges for terminal edge-abutment when the strip is coiled.

6. The method of claim 5, said first and second flanges being formed to project at substantially right angles relative to the plane of the strip.

7. The method of claim 1, said channel being formed with a substantially U-shape cross-section defined by the second flange, a side wall parallel to said second flange and an interconnecting side wall.

8. The method of claim 1, said first and second flanges being of substantially the same width, whereby said terminal and abutting edges are joined on a spiral substantially midway between the inner circumference of the pipe and the outer circumference of the rib.

9. A helical ribbed pipe formed from strip having a pair of terminal side edges, said pipe having a spiral rib and a helical seam formed in the rib by butt welding the terminal side edges of strip, said rib comprising a first side flange and a channel that includes a second side flange said seam being located substantially midway between the inner circumference of the pipe and the outer circumference of the rib.

10. The helical ribbed pipe of claim 9, said spiral rib comprising the first side flange having one of said terminal edges and the channel that includes the second side flange having the other one of said terminal edges, said first side flange being formed along one edge of the strip, said channel and second side flange being formed along the other edge of the strip, said first and second flanges projecting substantially perpendicular to the axis of the pipe.

11. The helical ribbed pipe of claim 10, said first and second flanges being formed to project from said strip at substantially 90° relative to the plane of the strip prior to coiling.

12. The helical ribbed pipe of claim 10, said first and second flanges being formed to project at complementary angles relative to the strip plane, and positioning said flanges for terminal edge-abutment when the strip is coiled.

* * * * *